US012705119B2

(12) United States Patent
Leitner et al.

(10) Patent No.: US 12,705,119 B2
(45) Date of Patent: Aug. 11, 2026

(54) COORDINATING DATA PACKET PROCESSING BETWEEN KERNEL SPACE AND USER SPACE

(71) Applicant: RED HAT, INC., Raleigh, NC (US)

(72) Inventors: Flavio Leitner, Maringa (BR); Aaron Conole, Brookline, NH (US); Mark Gray, Ennis (IE); Ilya Maximets, Prague (CZ)

(73) Assignee: Red Hat, Inc., Raleigh, NC (US)

( * ) Notice: Subject to any disclaimer, the term of this patent is extended or adjusted under 35 U.S.C. 154(b) by 860 days.

(21) Appl. No.: 17/411,564

(22) Filed: Aug. 25, 2021

(65) Prior Publication Data

US 2023/0060132 A1 Mar. 2, 2023

(51) Int. Cl.
*G06F 9/54* (2006.01)
*H04L 45/02* (2022.01)

(52) U.S. Cl.
CPC .............. *G06F 9/545* (2013.01); *G06F 9/546* (2013.01); *H04L 45/02* (2013.01)

(58) Field of Classification Search
CPC ........... G06F 9/545; G06F 9/546; H04L 45/02
See application file for complete search history.

(56) References Cited

U.S. PATENT DOCUMENTS 8,209,704 B1 6/2012 Mccann et al.
9,465,617 B1 10/2016 Warkentin et al.
9,582,325 B2 2/2017 Bilavarn et al.
10,382,248 B2 8/2019 Pope et al.
10,509,673 B2 12/2019 Klee et al.
(Continued)

FOREIGN PATENT DOCUMENTS

WO WO-2021226948 A1 * 11/2021

OTHER PUBLICATIONS

Netlink-socket.h; https://github.com/openvswitch/ovs/blob/master/lib/netlink-socket.h; Mar. 31, 2018; 7 pages (Year: 2018).*
(Continued)

*Primary Examiner* — Kevin L Young
*Assistant Examiner* — Kimberly L Jordan
(74) *Attorney, Agent, or Firm* — Kilpatrick Townsend & Stockton LLP

(57) ABSTRACT

A system may comprise a group of processor cores configured to generate kernel-space threads in a kernel space and user-space threads in a user space of a Linux operating system. Each kernel-space thread may be executable by one of the processor cores to perform operations. For example, a kernel-space thread may receive a data packet transmitted from a client device via a network. The kernel-space thread may determine a particular communication channel assigned to a processor core that is executing the kernel-space thread. The kernel-space thread may determine if the data packet satisfies a condition based on information extracted from the data packet. In response to determining that the data packet does not satisfy the condition, the kernel-space thread may transmit data from the data packet via the particular communication channel to a user-space thread. The user-space thread may be configured to receive and process the data.

20 Claims, 6 Drawing Sheets

(56) References Cited

U.S. PATENT DOCUMENTS

| | | | | |
|---|---|---|---|---|
| 2008/0114973 | A1* | 5/2008 | Norton | G06F 9/485<br>712/228 |
| 2010/0322104 | A1 | 12/2010 | Kanekar et al. | |
| 2011/0088041 | A1* | 4/2011 | Alameldeen | G06F 9/505<br>718/105 |
| 2013/0173956 | A1* | 7/2013 | Anderson | H03M 13/373<br>714/6.24 |
| 2016/0380885 | A1* | 12/2016 | Jani | H04L 47/781<br>370/408 |
| 2017/0214612 | A1* | 7/2017 | Leitner | H04L 49/9036 |
| 2020/0328966 | A1* | 10/2020 | Wang | H04L 45/745 |

OTHER PUBLICATIONS

Mark Gray; dpif-netlink: Introduce per-cpu upcall dispatch; https://mail.openvswitch.org/pipermail/ovs-dev/2021-June/384675.html; Jun. 30, 2021; 17 pages (Year: 2021).*

Marco Bonelli; Stack Overflow—Could the affinity of thread created by kernel be set by "cpuset"?; May 22, 2020; 3 pages (Year: 2020).*

Extended European Search Report and Written Opinion for EP Appln. No. 21209171.4 mailed May 10, 2022.

Zhang et al., "FastUDP: a highly scalable user-level UDP framework in multi-core systems for fast packet I/O", The Journal of Super Computing, vol. 77, No. 5, Nov. 3, 2020; pp. 5148-5175.

Barbette, T., et al., "Fast Userspace Packet Processing," IEEE, University of Liege Belgium, 2015, https://ieeexplore.ieee.org/abstract/document/7110116.

Hanford, N., et al., "Characterizing the Impact of End-System Affinities on the End-to-End Performance of High-Speed Flows," Department of Computer Science, University of California, 2013, http://citeseerx.ist.psu.edu/viewdoc/download?doi=10.1.1.641.7113&rep=rep1&type=pdf.

* cited by examiner

300

COORDINATING DATA PACKET PROCESSING BETWEEN KERNEL SPACE AND USER SPACE

TECHNICAL FIELD

The present disclosure relates generally to processing data packets in computing systems. More specifically, but not by way of limitation, this disclosure relates to coordinating data packet processing between kernel spaces and user spaces in operating systems.

BACKGROUND

Computers use operating systems to manage system processes and resources. Some operating systems, such as the Linux operating system, include a low-level software component, referred to as a kernel, for managing system processes and resources. The memory of the operating system can be partitioned into two distinct regions: a kernel space and a user space. The kernel space is where the kernel executes and provides its services. The user space is where user processes (e.g., everything other than the kernel) execute. Generally, the kernel space can only be accessed by user processes through system calls. A system call is a request by a user process for a service performed by the kernel, such as an input/output (I/O) service. User processes can invoke system calls for causing the kernel to perform tasks in kernel space. Conversely, the kernel can perform upcalls. An upcall is a request by the kernel for a user process to perform a task in user space.

DETAILED DESCRIPTION

Figure 1:
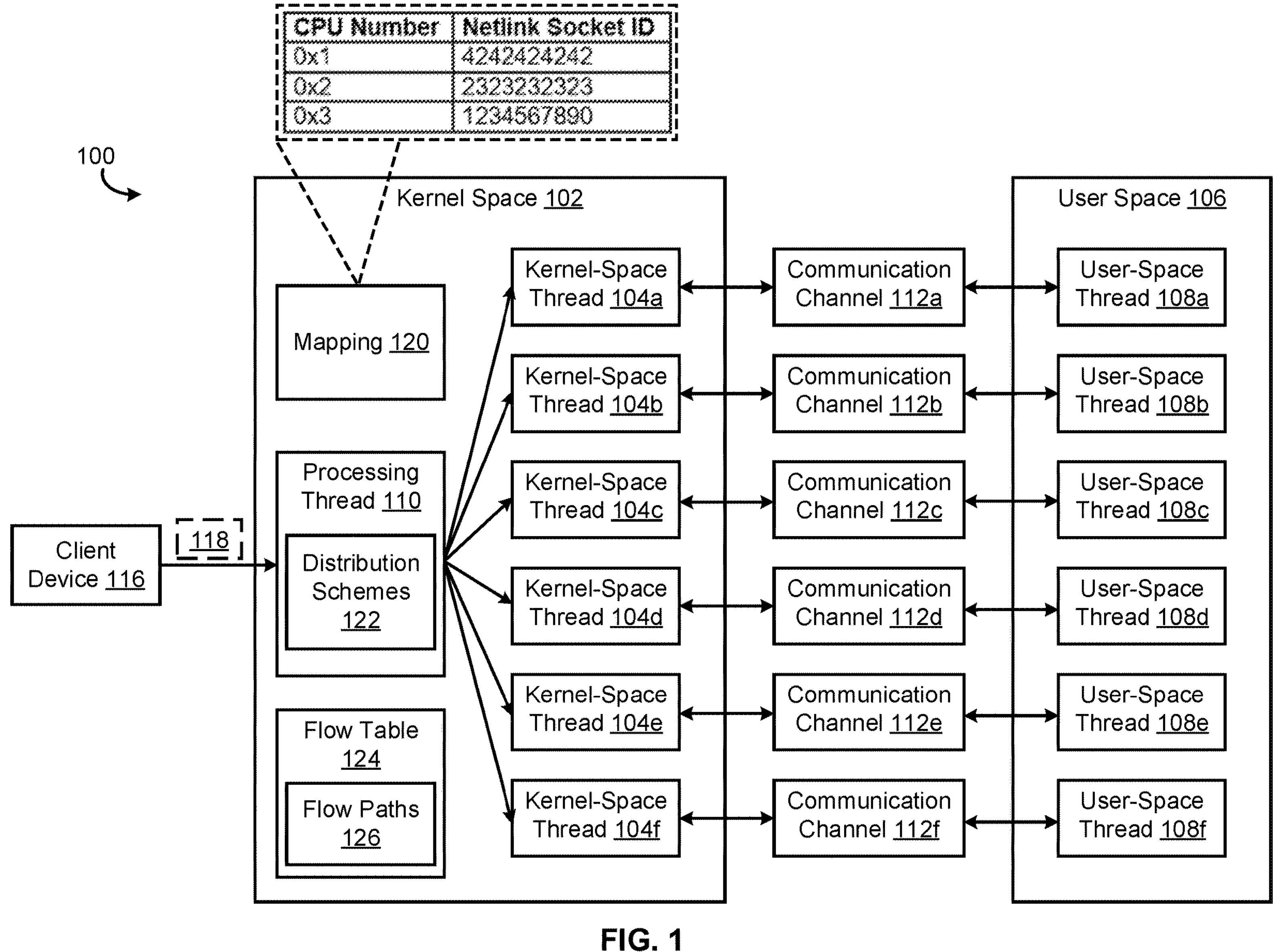
FIG. 1 is a block diagram of an example of a system including a kernel space and a user space for coordinating data flow according to some aspects of the present disclosure.

A computing system with multiple processor cores may receive data packets via ports. In some cases, a communication channel can be established between each port and each processor core to transmit data packets to the processor core for handling. For example, a computing system with two processor cores and three ports may establish six communication channels, such that there is a first set of communication channels between the first processor core and the three ports and a second set of communication channels between the second processor core and the three ports. But there are limits on the number of communication channels that may be created on a given computing system given the finite number of available computing resources (e.g., processing power and memory). As a result, this approach can quickly reach the maximum number of communication channels that can be created, resulting in scaling problems.

Computing systems can also have other problems with respect to how data packets are handled. For example, each data packet may be received by any of the processor cores. But when a data packet is received by a processor core, it may trigger the thundering herd problem, where a large number of processes or threads in the computing system are concurrently "awoken" and attempt to process the data packet even though only one process or thread may actually do so. This may cause the processes or threads to unnecessarily consume and compete for resources, which may negatively affect the performance of the computing system. Computing systems may also have difficulty processing multiple data packets in a particular order. For example, a computing system may establish a single communication channel for each port. A single port may have multiple threads processing data packets from that port. If multiple data packets are received by that port in a particular order, the multiple threads may process the multiple data packets. Because some threads may process data packets faster than other threads, or because of how data processing is distributed among the threads, the multiple data packets may be processed out-of-order (e.g., in an order that is different from the sequence in which the data packets were received). This may cause problems in a variety of contexts in which maintaining the order of the data packets is important.

Some examples of the present disclosure can overcome one or more of the abovementioned problems by generating a one-to-one mapping of kernel-space threads to user-space threads, so that the same types of data packets are handled by the same kernel-space thread and the same user-space thread. A kernel-space thread is a processing thread operating in kernel space, and a user-space thread is a processing thread operating in user space. More specifically, a computing system can include multiple thread pairs, where each pair includes a single kernel-space thread and a single user-space thread. The user-space thread may establish a single communication channel between itself and the kernel-space thread. The Linux kernel can receive data packets and distribute the incoming data packets among the kernel-space threads according to a predefined distribution scheme, for example such that the same types of data packets are consistently distributed to the same kernel-space thread. This, in turn, may help ensure that the data packets are handled by the same user-space thread. Since the same types of data packets are consistently handled by the same kernel-space thread and the same user-space thread, the sequencing problem described above may be avoided. And by using the same kernel-space thread and user-space thread to consistently handle the same types of data packets, the scaling problem and thundering herd problem described above may also be avoided.

As one particular example, the above techniques may be implemented by a network switch, router, or other networking component executing a Linux operating system with a kernel. After receiving a data packet, a kernel-space thread of the networking component may determine if a flow path exists for the data packet in a flow table located in the Linux kernel. The flow table may be a table of flow paths. A flow path may correspond to a type of data packet and may include instructions for how to handle that type of data packet. If a flow path exists for the data packet, the kernel-space thread may execute the instructions included in the flow path on the data packet. If the flow path does not exist, the kernel-space thread may transmit (e.g., via an upcall) the data packet to the user-space thread that corresponds to the kernel-space thread via a communication channel, so that the user-space thread can further process the data packet. For example, the user-space thread may determine a flow path for the data packet. The user-space thread may transmit data describing the flow path to the kernel-space thread, which can receive the data and add the flow path to the flow table. Thereafter, the kernel-space thread may receive new data packets that are similar to (e.g., of the same type as) the previously handled data packet. Because the kernel-space thread may now have the requisite flow path information in the flow table, the kernel-space thread can access the flow path and handle the data packets accordingly, instead of relying on the user-space thread again to process the new data packets. This can reduce latency and conserve computing resources.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 is a block diagram of an example of a system 100 including a kernel space 102 and a user space 106 for coordinating data flow according to some aspects of the present disclosure. The kernel space 102 and the user space 106 can exist in a memory of a Linux operating system. The kernel space 102 can include kernel-space threads 104*a-f*, which are processing threads executing in the kernel space 102. The user space 106 can include user-space threads 108*a-f*, which are processing threads executing in the user space 106. The kernel-space threads 104*a-f* and user-space threads 108*a-f* may be executed by processor cores.

The user-space threads 108*a-f* may generate communication channels 112*a-f* for enabling the user-space threads 108*a-f* and the kernel-space threads 104*a-f* to communicate (e.g., bidirectionally) with one another. Examples of the communication channels 112*a-f* may include netlink sockets or shared memory locations. Each user-space thread 108 may generate one communication channel 112, and each communication channel 112 may be associated with one kernel-space thread 104. In some examples, a paired kernel-space thread and user-space thread, such as kernel-space thread 104*a* and user-space thread 108*a*, may be executed by the same processor core or different processor cores.

After generating the communication channels, the user-space threads 108*a-f* can transmit identifiers of the communication channels 112*a-f* to the kernel-space threads 104*a-f*. Examples of the identifiers may include a netlink socket ID or a memory location. One or more of the kernel-space threads 104*a-f* may use the identifiers to generate a mapping 120. The mapping 120 can indicate relationships between the user-space threads 108*a-f* and the kernel-space threads 104*a-f*. For example, the mapping 120 can define relationships between the communication channel identifiers and the processor cores executing the kernel-space threads 104*a-f*. An example of such a mapping 120 is shown in the dashed box of FIG. 1.

Once the mapping 120 has been generated, one or more client devices 116 may send data packets 118 to a processing thread 110 located within the kernel space 102. Thus, the processing thread 110 is a kernel-space thread. The processing thread 110 can include one or more distribution schemes 122. The data packets 118 can include a sequence of data packets that can be distributed by the processing thread 110 to individual kernel-space threads 104*a-f* according to the distribution schemes 122. The distribution schemes 122 may be predefined. Examples of the distribution schemes 122 can include receive flow steering ("RFS"), receive side-scaling ("RSS"), and receive packet steering ("RPS").

After receiving a data packet 118, a kernel-space thread 104, such as kernel-space thread 104*c*, may process the data packet 118. In some examples, processing the data packet 118 may include extracting information (e.g., header data or payload data) from the data packet 118 and analyzing the extracted information to determine whether it satisfies one or more predefined criteria. For example, the system 100 can be part of a virtual switch such as Open vSwitch. In some such examples, the kernel-space thread 104*c* can analyze header data of the data packet 118 to determine if the data packet 118 corresponds to any flow paths 126 defined in a flow table 124 in the kernel space 102. If the data packet 118 corresponds to a flow path 126 in the flow table 124, the kernel-space thread 104*c* may execute actions associated with the flow path 126 corresponding to the data packet 118. For example, the kernel-space thread 104*c* may transmit the data packet 118 out of the system 100 to a destination. If the data packet 118 does not correspond to any flow paths 126 in the flow table 124, it may mean that a flow path for the data packet 118 does not yet exist in the flow table 124. So, the kernel-space thread 104*c* may coordinate with the user space 106 so that the data packet 118 can be further processed in user space 106. Coordinating with the user space 106 may include transmitting the data packet 118 or the information extracted therefrom to the user space 106 for further processing by a corresponding user-space thread.

The kernel-space thread 104*c* may transmit the data packet 118 or information extracted therefrom to the user space 106 via one of the communication channels 112*a-f*. To determine which communication channel to use, the kernel-space thread 104*c* access the mapping 120. For example, the kernel-space thread 104*c* can determine which particular processor core is executing the kernel-space thread 104*c*. The kernel-space thread 104*c* may then access the mapping 120 to identify a particular communication channel 112*c* that is associated with that processor core. For example, the communication channel 112*c* can be correlated in the mapping 120 to the processor core that executes kernel-space thread 104*c*. So, kernel-space thread 104*c* can transmit the data packet 118 via communication channel 112*c* to whichever user-space thread 108*a-f* corresponds to that communication channel 112*c*. Since user-space thread 108*c* corresponds to the communication channel 112*c* in FIG. 1, the user-space thread 108*c* can receive the data packet 118 and perform additional processing with respect to the data packet 118. For example, the user-space thread 108*c* can determine a flow path for the data packet 118 based on information extracted from the data packet 118. The user-space thread 108*c* may then cause the flow path to be included in the flow table 124. For example, the user-space thread 108*c* can indicate the flow path to the kernel-space thread 104*c*, which in turn can incorporate the flow path into the flow table 124.

In the above example, the kernel-space thread 104*c* provided the data packet 118 to the user-space thread 108*c* in response to determining that the data packet 118 does not satisfy one or more predefined criteria. In particular, the kernel-space thread 104*c* provided the data packet 118 to the user-space thread 108*c* in response to determining that the data packet 118 does not correspond to any flow paths 126 in the flow table 124. But, the kernel-space thread 104*c* may additionally or alternatively provide the data packet 118 to the user-space thread 108*c* for other reasons. For example, the kernel-space thread 104*c* can provide the data packet 118 to the user-space thread 108*c* in response to determining that the data packet 118 does satisfy one or more predefined criteria. In one such example, the kernel-space thread 104*c* can determine that the data packet 118 has a corresponding flow path in the flow table 124. But the flow path may include instructions for the kernel-space thread 104*c* to provide (e.g., via an upcall) the data packet 118 to the user-space thread 108*c*, so that the user-space thread 108*c* can further process the data packet 118 (e.g., rather than the kernel-space thread 104*c*). This may be done, for example, to provide the data packet 118 to a particular user-space application or because the kernel-space thread 104*c* does not support a particular computing operation. Based on these instructions, the kernel-space 104*c* can still provide the data packet 118 to the user-space thread 108*c*.

As noted above, the processing thread 110 may forward data packets 118 of the same type to a single kernel-space thread 104 based on the distribution scheme 122. This may allow for the data packets 118 to be processed in sequence by the same kernel-space thread 104 (and consequently the same user-space thread 108). By processing the data packets 118 in sequence, it may allow for the data packets 118 to be transmitted to a destination in the same order that they were received by the processing thread 110. In this way, the ordering of the data packets 118 can be preserved such that they arrive at the destination in a correct sequence.

Although FIG. 1 depicts a certain number and arrangement of components, this is for illustrative purposes and intended to be non-limiting. Other examples may include more components, fewer components, different components, or a different arrangement of the components shown in FIG. 1.

Figure 2:
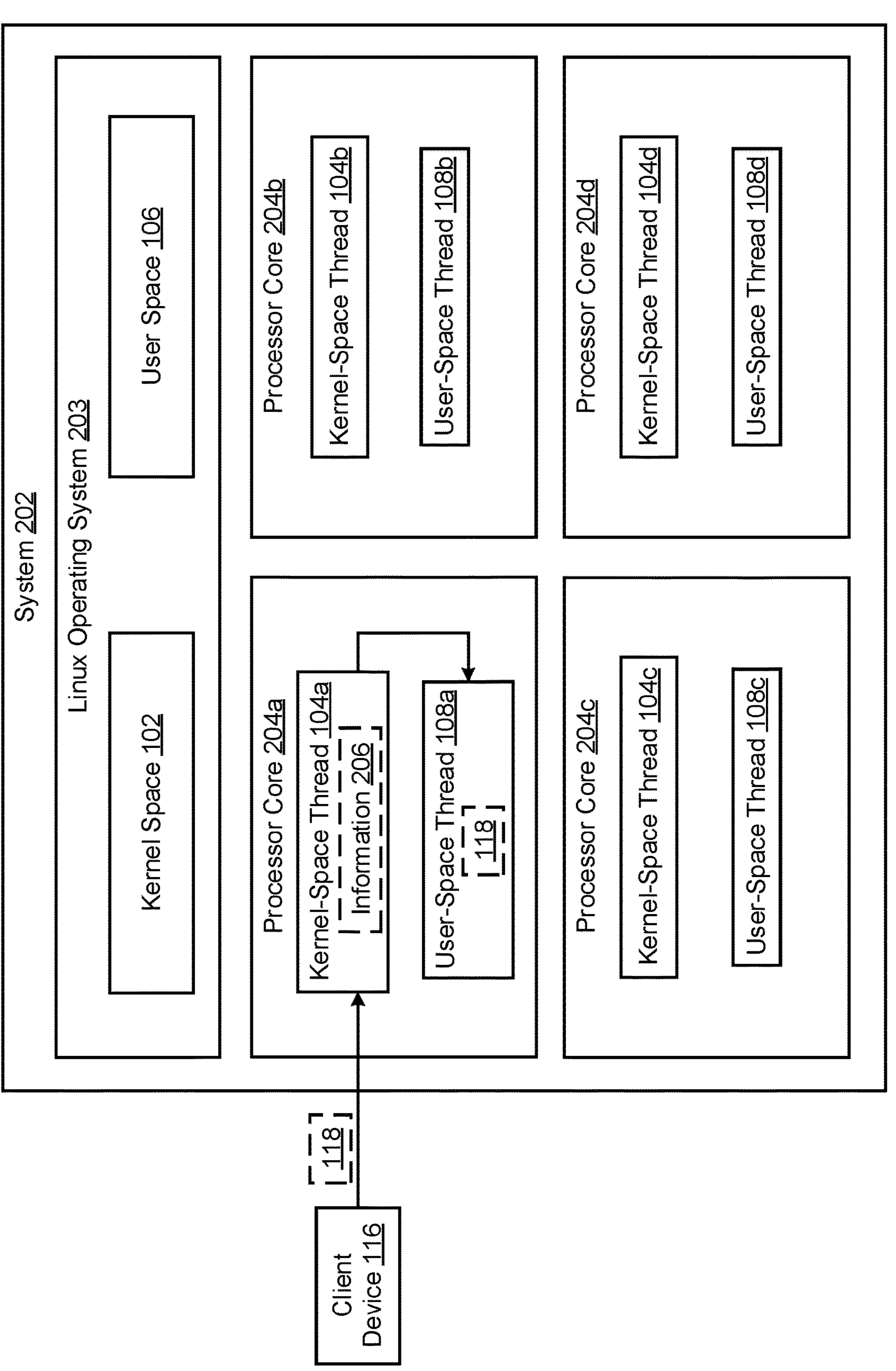
FIG. 2 is a block diagram of a system including multiple processor cores for coordinating data flow according to some aspects of the present disclosure.

FIG. 2 is a block diagram of a system 202 including multiple processor cores 204*a-d* for coordinating data flow according to some aspects of the present disclosure. Although FIG. 2 shows four processor cores 204*a-d*, in other examples the system 202 may include more or fewer processor cores. The system 202 may include a Linux operating system 203 that includes a kernel space 102 and a user space 106. The kernel space 102 and the user space 106 may contain kernel-space threads 104*a-d* and user-space threads 108*a-d*, respectively. Each processor core 204 may execute a kernel-space thread 104 and a user-space thread 108.

Non-limiting examples of the processor cores 204*a-d* include a Field-Programmable Gate Array (FPGA), an application-specific integrated circuit (ASIC), a microprocessor, etc. The processor cores 204*a-d* can execute instructions stored in memory to perform operations. The instructions may include processor-specific instructions generated by a compiler or an interpreter from code written in any suitable computer-programming language, such as C, C++, C#, etc. In some examples, the instructions can correspond to the kernel-space threads 104*a-d* or user-space threads 108*a-d.*

The system 202 can also include a memory. The memory can have a set of memory locations allocated to kernel space 102 and another set of memory locations allocated to user space 106. The memory can include one memory device or multiple memory devices. The memory can be non-volatile and may include any type of memory that retains stored information when powered off. Non-limiting examples of the memory include electrically erasable and programmable read-only memory (EEPROM), flash memory, or any other type of non-volatile memory. At least some of the memory can include a non-transitory computer-readable medium from which the processor cores 204*a-d* can read instructions. A computer-readable medium can include electronic, optical, magnetic, or other storage devices capable of providing the processor cores 204*a-d* with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions.

The processor cores 204*a-d* can execute the instructions to perform operations. For example, a client device 116 may send a data packet 118 to the system 202. The data packet 118 may be distributed to kernel-space thread 104*a* executing on processor core 204*a*. The kernel-space thread 104*a* may extract information 206 from the data packet 118. The information 206 may be used by the kernel-space thread 104*a* to determine if the data packet 118 satisfies a condition. For example, the condition may be whether a flow path 126 exists for the data packet 118. If the condition is not satisfied, the kernel-space thread 104*a* may transmit the data packet 118 or the information 206 extracted therefrom to a user-space thread 108*a* that corresponds to the kernel-space thread 104*a*. The user-space thread 108*a* and the kernel-space thread 104*a* may be executed by the same processor core 204*a*. The user-space thread 108*a* can receive and process the data packet 118 or information 206. For example, the user-space thread 108*a* may inspect, filter, or analyze the data packet 118. Based on the processing results, the user-space thread 108*a* may perform one or more computing operations. For example, the user-space thread 108*a* may deliver the data packet 118 to an application such as a web server. As another example, the user-space thread 108*a* may determine a flow path for the data packet and insert the flow path into a flow table. As yet another example, the user-space thread 108*a* may reject the data packet 118 (e.g., if the data packet is determined to be suspicious or malicious).

Figure 3:
FIG. 3 is a flow chart of an example of a process performed by a kernel-space thread for handling a data packet according to some aspects of the present disclosure.

FIG. 3 is a flow chart of an example of a process 300 performed by a kernel-space thread 104*a* for handling a data packet 118 according to some aspects of the present disclosure. Other examples can include more steps, few steps, different steps, or a different order of steps than is shown in FIG. 3. The steps of FIG. 3 are discussed below with reference to the components discussed above in relation to FIG. 2.

In block 302, a kernel-space thread 104*a* executing on a processor core 204*a* receives a data packet 118 transmitted from a client device 116 via a network. The network may be a local area network or the Internet.

In block 304, the kernel-space thread 104*a* determines, from among a group of communication channels 112*a-d* assigned to processor cores 204*a-d*, a particular communication channel 112*a* assigned to the processor core 204*a* that includes the kernel-space thread 104*a*. The kernel-space thread 104*a* may determine the particular communication channel 112*a* by accessing a mapping 120 located in the memory. Each communication channel 112 may be associated with a single processor core 204, and the mapping 120 may include a table of the associations.

In block 306, the kernel-space thread 104*a* determines if the data packet 118 satisfies a condition based on information 206 (e.g., header data, payload data, etc.) extracted from the data packet 118. For example, the information 206 may include a source address, such as an IP address or a MAC address. The kernel-space thread 104*a* may access a flow table 124 located in the memory to determine if a flow path 126 exists for data packets 118 with a certain source address. If the flow path 126 exists for the source address, the data packet 118 satisfies the condition and the kernel-space thread 104*a* may process the data packet 118 according to the instructions in the flow path 126. If the data packet 118 does not satisfy the condition, the process 300 continues to block 308.

In block 308, in response to determining that the data packet 118 does not satisfy the condition, the kernel-space thread 104*a* transmits data from the data packet 118 via the particular communication channel 112*a* to a user-space thread 108*a* of the plurality of user-space threads 108. The data may be the same as or different from the information 206. The user-space thread 108*a* is configured to receive and process the data. The user-space thread 108*a* may have additional instructions and resources for processing the data that the kernel-space thread 104*a* may not have. The user-space thread 108*a* may transmit the data packet 118 to a destination (e.g., that is remote to the system 202) after processing.

Figure 4:
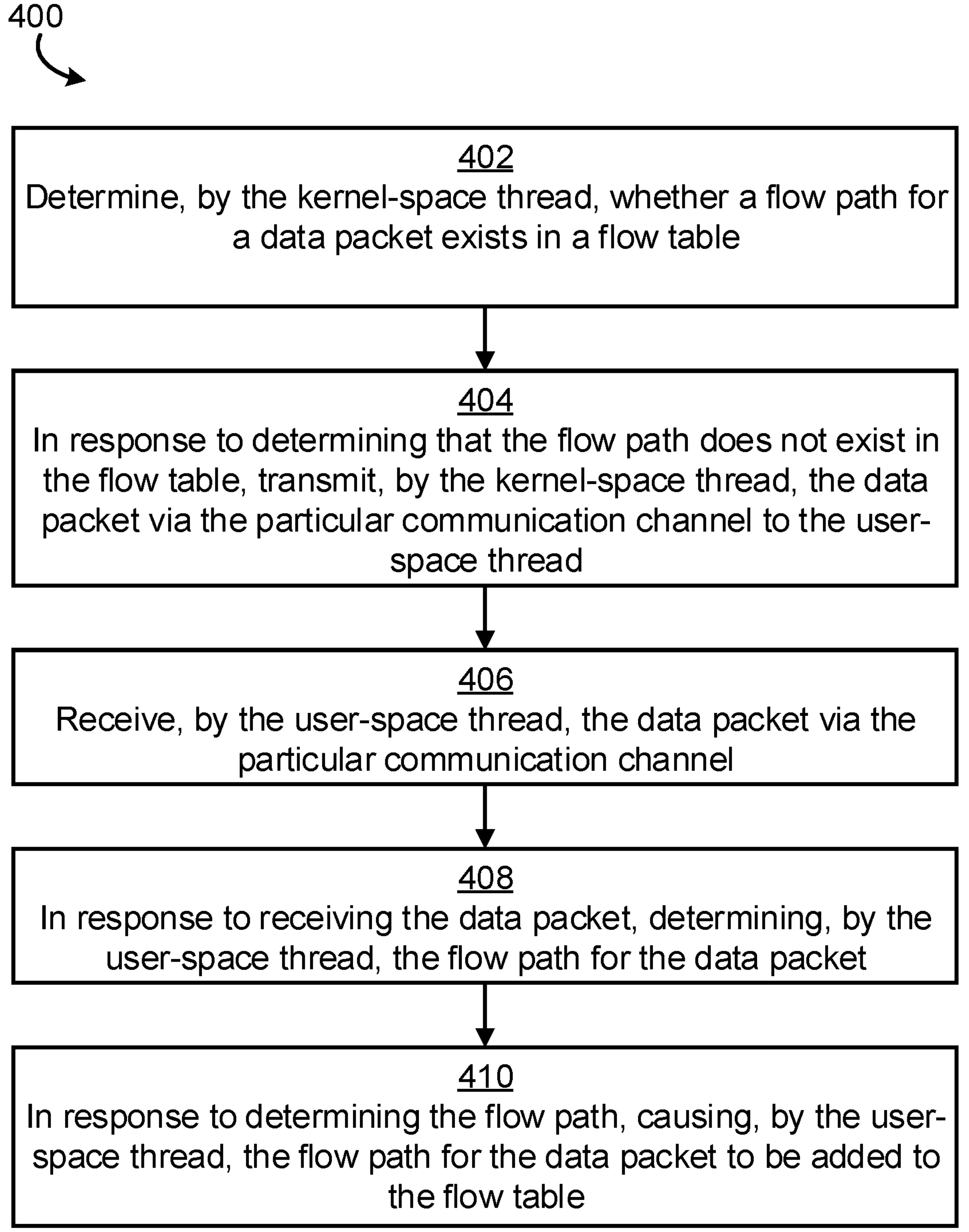
FIG. 4 is a flow chart of an example of a process performed by a kernel-space thread and a user-space thread for handling a data packet according to some aspects of the present disclosure.

FIG. 4 is a flow chart of an example of a process 400 performed by a kernel-space thread 104*a* and a user-space thread 108*a* for handling a data packet 118 according to some aspects of the present disclosure. Other examples can include more steps, few steps, different steps, or a different order of steps than is shown in FIG. 4. The steps of FIG. 4 are discussed below with reference to the components discussed above in relation to FIG. 2.

In block 402, the kernel-space thread 104*a* determines whether a flow path 126 for a data packet 118 exists in a flow table 124. To do so, the kernel-space thread 104*a* may determine if the flow paths 126 in the flow table 124 are associated with information 206 extracted from the data packet 118.

In block 404, in response to determining that the flow path 126 does not exist in the flow table 124, the kernel-space thread 104*a* transmits the data packet 118 via the particular communication channel 112*a* to the user-space thread 108*a*.

In block 406, the user-space thread 108*a* receives the data packet 118 via the particular communication channel 112*a*.

In block 408, in response to receiving the data packet 118, the user-space thread 108*a* determines a flow path 126 for the data packet 118. In particular, the user-space thread 108*a* may determine a flow path 126 using information 206 extracted from the data packet 118. The user-space thread 108*a* may use predetermined user-defined criteria for assigning a flow path to the data packet 118.

In block 410, in response to determining the flow path 126, the user-space thread 108*a* causes the flow path 126 for the data packet 118 to be added to the flow table 124. For example, the user-space thread 108*a* may indicate the flow path 126 to the kernel-space thread 104*a* via the communication channel 112*a*. In some examples, the communication channels 112*a* may be a shared memory location between the kernel-space thread 104*a* and the user-space thread 108*a*. For example, the user-space thread 108*a* may store data describing the flow path 126 in the shared memory location, and the kernel-space thread 104*a* may access the shared memory location to retrieve data. In other examples, the communication channel 112*a* may be a netlink socket for transmitting data describing the flow path 126 from the user-space thread 108*a* to the kernel-space thread 104*a*. The kernel-space thread 104*a* may then add the flow path 126 to the flow table 124. Alternatively, the user-space thread 108*a* may directly add the flow path 126 to the flow table 124. Adding the flow path 126 to the flow table 124 may allow subsequent data packets 118 received by the kernel space 102 to be processed by a kernel-space thread 104 rather than a user-space thread 108, so as to reduce latency and conserve computing resources (e.g., processing power and memory).

Figure 5:
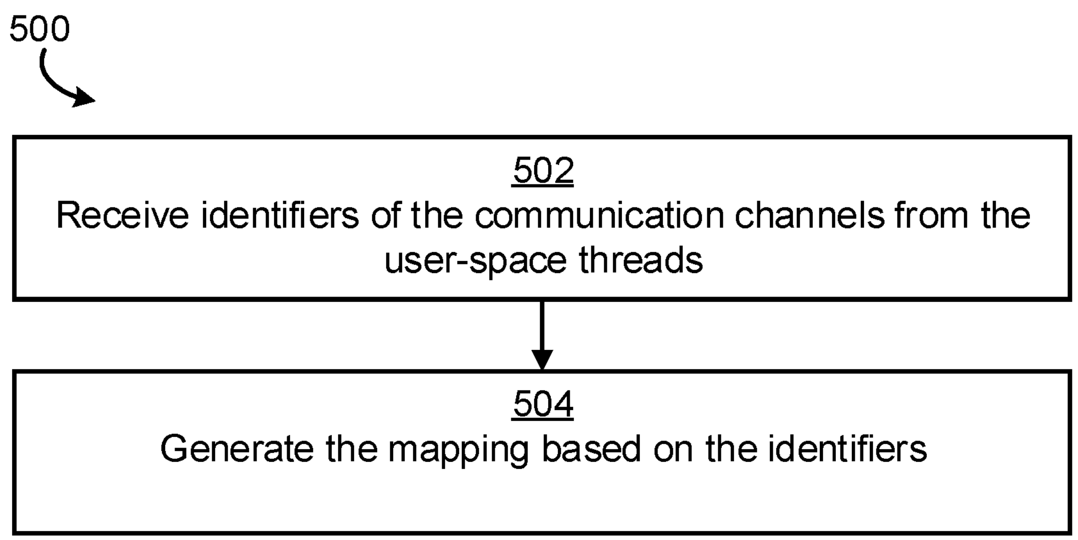
FIG. 5 is a flow chart of an example of a process performed by a processing thread generating a mapping according to some aspects of the present disclosure.

FIG. 5 is a flow chart of an example of a process 500 for generating a mapping 120 according to some aspects of the present disclosure. Other examples can include more steps, few steps, different steps, or a different order of steps than is shown in FIG. 5. The steps of FIG. 5 are discussed below with reference to the components discussed above in relation to FIGS. 1-2.

In block 502, one or more processing threads receive identifiers of the communication channels 112 from the user-space threads 108. Examples of the one or more processing threads can include the one or more kernel-space threads 104, the processing thread 110, or any combination of these. Each user-space thread 108 may generate a single communication channel 112. Each communication channel 112 may be associated with a single processor core 204. In one example, user-space thread 108*a* may generate a communication channel 112*a* that has an identifier. The communication channel 112*a* may be a netlink socket with a netlink socket ID. The processing thread may receive the netlink socket ID from user-space 108*a*.

In block 504, the processing thread 110 generates the mapping 120 based on the identifiers. In some examples, the mapping 120 may be a table of associations between communication channel identifiers (e.g., netlink socket ID's) and processor-core identifiers. The processor-core identifiers can identify the processor cores 204. The processor cores 204 can execute the user-space threads 108 that sent the communication channel identifiers. A reason that the communication channels may be correlated in the mapping 120 to the processor cores 204 is that the kernel space 102 and the user space 106 may have different views of the computer system (e.g., the available number of processor cores 204*a-d*), and thus using the processor cores in the mapping 120 can provide a common indexing mechanism between user space 106 and kernel space 102. The mapping 120 may be accessed by a kernel-space thread 104 for determining a communication channel to which to transmit a data packet 118 for further processing by a user-space thread.

While the above examples involve kernel-space threads providing data packets to user-space threads, the present disclosure is not intended to be limited to this arrangement. Similar techniques can also be applied such that kernel-space threads provide data packets to other kernel-space threads, user-space threads provide data packets to other user-space threads, or user-space threads provide data packets to kernel-space threads. Thus, any processing thread in the system may provide data packets to any other processing thread, regardless of whether the other processor thread is located on the same processor core or a different processor core. This is described in further detail below with respect to FIG. 6.

Figure 6:
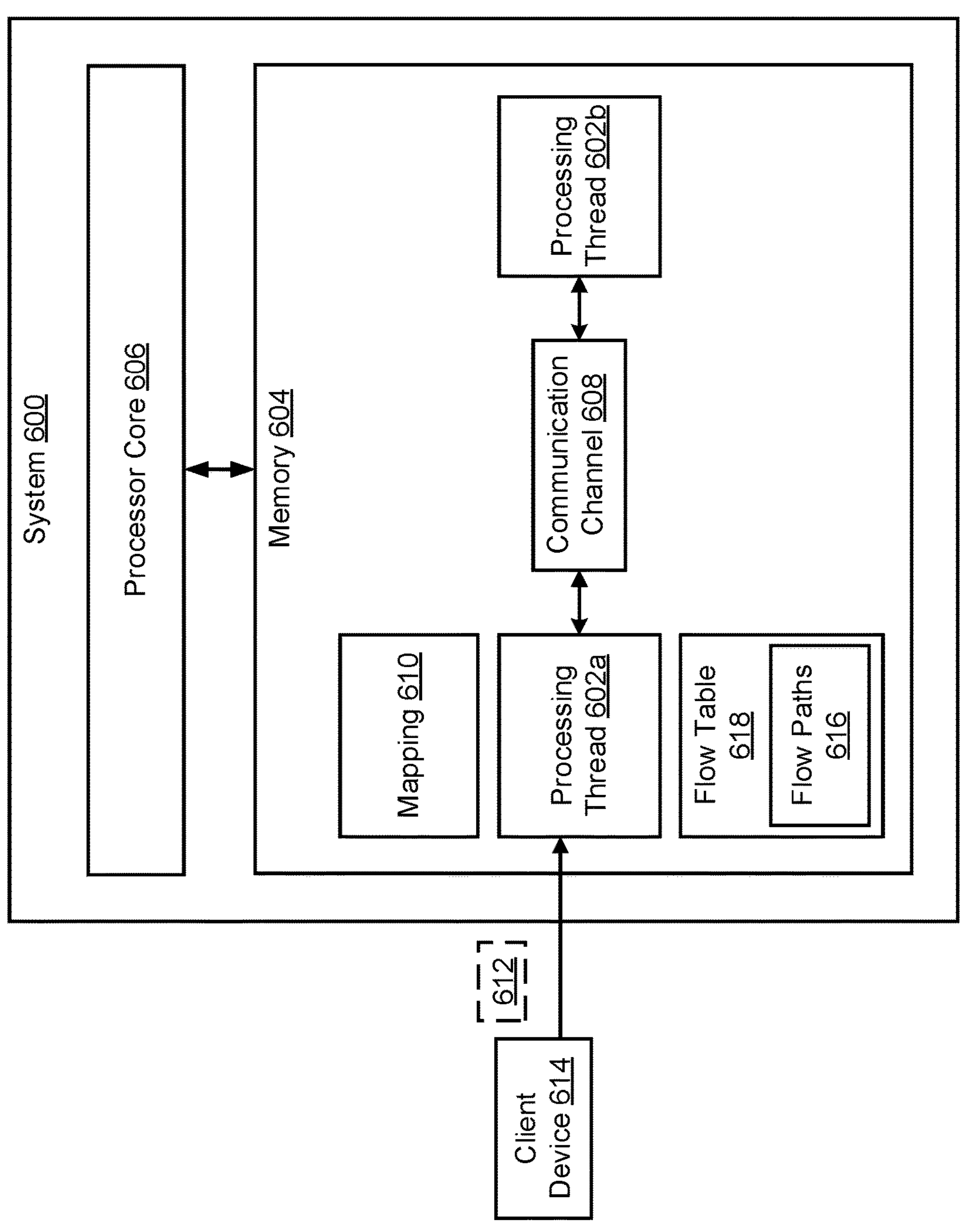
FIG. 6 is a block diagram of an example of a system including multiple processing threads for coordinating data flow according to some aspects of the present disclosure.

FIG. 6 is a block diagram of an example of a system 600 including multiple processing threads 602*a* and 602*b* for coordinating data flow according to some aspects of the present disclosure. In some examples, a computing system such as the system 600 may include processing thread pairs. The processing thread pairs may include one kernel-space thread and one user-space thread, as depicted in FIGS. 1 and 2. Alternatively, the processing thread pairs may include any two threads in a computing system, such as processing threads 602*a* and 602*b*. In the example depicted in FIG. 6, processing threads 602*a* and 602*b* may both be user-space threads or may both be kernel-space threads. The processing threads 602*a-b* may be located in a memory 604 in the system 600. As depicted in FIG. 6, the processing threads 602*a-b* may be executed by a single processor core 606 in the system 600 to coordinate data flow. Alternatively, processing thread 602*a* may be executed by a first processor core and processing thread 602*b* may be executed by a second processor core in the system 600.

The processing threads 602*a-b* may coordinate data flow in a similar manner to the systems and methods described above with respect to FIGS. 1-5. For example, the processing thread 602*b* may generate a communication channel 608 for enabling the processing threads 602*a-b* to communicate (e.g., bidirectionally) with one another. The processing thread 602*b* may transmit an identifier of the communication channel 608 to the processing thread 602*a*. The processing thread 602*a* may use the identifier to generate a mapping 610 that can indicate a relationship between the processing threads 602*a-b*. The processing thread 602*a* may receive a data packet 612 from a client device 614. The processing thread 602*a* may process the data packet 612 to determine if the data packet 612 corresponds to a flow path 616 in a flow table 618. If the data packet 612 does not correspond to any flow paths 616, the processing thread 602*a* may transmit the data packet 612 or information extracted therefrom to the processing thread 602*b* via the communication channel 608. The processing thread 602*b* may perform further processing on the data packet 612.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor core for generating a kernel-space thread configured to:

receive a data packet transmitted from a client device via a network;

determine, based on a mapping between a plurality of communication channels and a plurality of processor cores, a particular communication channel assigned to the processor core that includes the kernel-space thread, wherein the mapping comprises a plurality of processor core identifiers correlated to a plurality of communication channel identifiers, wherein each processor core of the plurality of processor cores is configured to execute a single kernel-space thread of a plurality of kernel-space threads and corresponds, via the mapping, to a single communication channel of the plurality of communication channels and a single user-space thread of a plurality of user-space threads;

determine if the data packet satisfies a condition based on information extracted from the data packet; and in response to determining that the data packet does not satisfy the condition, transmit data from the data packet via the particular communication channel to a user-space thread of the plurality of user-space threads, the user-space thread being configured to receive and process the data.

2. The non-transitory computer-readable medium of claim 1, further comprising program code that is executable by the processor core for causing the kernel-space thread to:

access the mapping of the plurality of processor cores to the plurality of communication channels, each processor core in the plurality of processor cores being correlated in the mapping to a respective communication channel of the plurality of communication channels, wherein each communication channel in the plurality of communication channels is for transmitting data packets to a corresponding user-space thread of the plurality of user-space threads; and determine the particular communication channel based on the mapping.

3. The non-transitory computer-readable medium of claim 1, wherein the condition involves the data packet having a corresponding flow path in a flow table, and further comprising program code that is executable by the processor core for causing the kernel-space thread to:

determine if the data packet satisfies the condition by checking whether a flow path for the data packet exists in the flow table; and in response to determining that the flow path does not exist in the flow table, transmit the data via the particular communication channel to the user-space thread, the user-space thread being configured to:

receive the data via the particular communication channel;

in response to receiving the data, determine the flow path for the data packet; and in response to determining the flow path, cause the flow path for the data packet to be added to the flow table.

4. The non-transitory computer-readable medium of claim 1, wherein the kernel-space thread is executed by the same processor core as the user-space thread that corresponds, via the mapping, to the kernel-space thread.

5. A system comprising:

a plurality of processor cores configured to generate a plurality of kernel-space threads in a kernel space of a Linux operating system and generate a plurality of user-space threads in a user space of the Linux operating system, each kernel-space thread of the plurality of kernel-space threads being executable by a particular processor core of the plurality of processor cores to:

receive a data packet transmitted from a client device via a network;

determine, based on a mapping between a plurality of communication channels and the plurality of processor cores, a particular communication channel assigned to the particular processor core that includes the kernel-space thread, wherein the mapping comprises a plurality of processor core identifiers correlated to a plurality of communication channel identifiers, wherein each processor core of the plurality of processor cores is configured to execute a single kernel-space thread of the plurality of kernel-space threads and corresponds, via the mapping, to a single communication channel of the plurality of communication channels and a single user-space thread of the plurality of user-space threads;

determine if the data packet satisfies a condition based on information extracted from the data packet; and in response to determining that the data packet does not satisfy the condition, transmit data from the data packet via the particular communication channel to a user-space thread of the plurality of user-space threads, the user-space thread being configured to receive and process the data.

6. The system of claim 5, wherein the condition involves the data packet having a corresponding flow path in a flow table, and wherein the kernel-space thread is configured to determine if the data packet satisfies the condition by checking whether a flow path for the data packet exists in the flow table.

7. The system of claim 6, wherein the user-space thread is configured to determine the flow path for the data packet and execute one or more actions associated with the flow path on the data packet.

8. The system of claim 7, wherein the user-space thread is configured to cause the flow path for the data packet to be added to the flow table.

9. The system of claim 6, wherein each kernel-space thread of the plurality of kernel-space threads is configured to, in response to determining that the flow path for the data packet exists in the flow table, execute one or more actions associated with the flow path on the data packet.

10. The system of claim 5, wherein the plurality of communication channels include a plurality of netlink sockets for communicating data between the kernel space and the user space.

11. The system of claim 5, wherein the plurality of communication channels include a plurality of shared memory locations between the kernel space and the user space, the plurality of shared memory locations being for communicating data between the kernel space and the user space.

12. The system of claim 5, wherein the kernel space includes at least one processing thread that is configured to:

receive a plurality of data packets over the network from one or more client devices; and distribute the plurality of data packets among the plurality of kernel-space threads according to one or more predefined distribution schemes.

13. The system of claim 12, wherein the plurality of data packets include a sequence of data packets, and wherein the one or more predefined distributed schemes are configured for causing each data packet in the sequence of data packets to be transmitted to a same kernel-space thread of the plurality of kernel-space threads for processing by the same kernel-space thread.

14. The system of claim 5, wherein kernel-space thread is further configured to:

access the mapping of the plurality of processor cores to the plurality of communication channels, each processor core in the plurality of processor cores being correlated in the mapping to a respective communication channel of the plurality of communication channels, wherein each communication channel in the plurality of communication channels is for transmitting data packets to a corresponding user-space thread of the plurality of user-space threads; and determine the particular communication channel based on the mapping.

15. The system of claim 14, wherein the kernel space includes at least one processing thread configured to receive a plurality of identifiers of the plurality of communication channels from the plurality of user-space threads and generate the mapping based on the plurality of identifiers, each user-space thread of the plurality of user-space threads being configured to establish a respective communication channel of the plurality of communication channels and transmit a respective identifier of the respective communication channel to the at least one processing thread for use in generating the mapping.

16. A method comprising:

receiving, by a kernel-space thread executing on a processor core, a data packet transmitted from a client device via a network;

determining, by the kernel-space thread and based on a mapping between a plurality of communication channels and a plurality of processor cores, a particular communication channel assigned to the processor core that includes the kernel-space thread, wherein the mapping comprises a plurality of processor core identifiers correlated to a plurality of communication channel identifiers, wherein each processor core of the plurality of processor cores is configured to execute a single kernel-space thread of a plurality of kernel-space threads and corresponds, via the mapping, to a single communication channel of the plurality of communication channels and a single user-space thread of a plurality of user-space threads;

determining, by the kernel-space thread and based on information extracted from the data packet, that the data packet does not satisfy a condition; and in response to determining that the data packet does not satisfy the condition, transmitting, by the kernel-space thread, data from the data packet via the particular communication channel to a user-space thread of the plurality of user-space threads that receives and processes the data.

17. The method of claim 16, wherein the condition involves the data packet having a corresponding flow path in a flow table, and further comprising:

determining, by the kernel-space thread, that the data packet does not satisfy the condition by checking whether a flow path for the data packet exists in the flow table;

in response to determining that the flow path does not exist in the flow table, transmitting, by the kernel-space thread, the data via the particular communication channel to the user-space thread;

receiving, by the user-space thread, the data via the particular communication channel;

in response to receiving the data, determining, by the user-space thread, the flow path for the data packet; and in response to determining the flow path, causing, by the user-space thread, the flow path for the data packet to be added to the flow table.

18. The method of claim 16, further comprising:

receiving, by at least one processor core of the plurality of processor cores, a sequence of data packets over the network from one or more client devices; and providing, by the at least one processor core, the sequence of data packets to a same kernel-space thread of the plurality of kernel-space threads based on one or more distribution schemes for causing the sequence of data packets to be processed by the same kernel-space thread.

19. The method of claim 16, further comprising:

accessing, by the kernel-space thread, the mapping of the plurality of processor cores to the plurality of communication channels, each processor core in the plurality of processor cores being correlated in the mapping to a respective communication channel of the plurality of communication channels, wherein each communication channel in the plurality of communication channels is for transmitting data packets to a corresponding user-space thread of the plurality of user-space threads; and determining, by the kernel-space thread, the particular communication channel based on the mapping.

20. The method of claim 19, further comprising:

receiving, by at least one processing thread, the plurality of communication channel identifiers of the plurality of communication channels from the plurality of user-space threads, each user-space thread of the plurality of user-space threads being configured to establish a respective communication channel of the plurality of communication channels and transmit a respective communication channel identifier of the respective communication channel to the at least one processing thread for use in generating the mapping; and generating, by the at least one processing thread, the mapping based on the plurality of communication channel identifiers and the plurality of processor core identifiers.

* * * * *